(12) United States Patent
Nakai et al.

(10) Patent No.: US 12,180,339 B2
(45) Date of Patent: Dec. 31, 2024

(54) FLEXIBLE POLYAMIDE

(71) Applicant: UNITIKA LTD., Osaka (JP)

(72) Inventors: Makoto Nakai, Kyoto (JP); Yuki Takubo, Kyoto (JP); Yusuke Yagi, Kyoto (JP)

(73) Assignee: UNITIKA LTD., Osaka (JP)

( * ) Notice: Subject to any disclaimer, the term of this patent is extended or adjusted under 35 U.S.C. 154(b) by 823 days.

(21) Appl. No.: 17/276,216

(22) PCT Filed: Oct. 23, 2019

(86) PCT No.: PCT/JP2019/041465
§ 371 (c)(1),
(2) Date: Mar. 15, 2021

(87) PCT Pub. No.: WO2020/085360
PCT Pub. Date: Apr. 30, 2020

(65) Prior Publication Data
US 2022/0033584 A1    Feb. 3, 2022

(30) Foreign Application Priority Data

Oct. 25, 2018 (JP) ................................ 2018-200983
Apr. 12, 2019 (JP) ................................ 2019-076575

(51) Int. Cl.
C08G 69/26 (2006.01)
C08G 69/28 (2006.01)
C08L 77/06 (2006.01)

(52) U.S. Cl.
CPC ............. *C08G 69/28* (2013.01); *C08G 69/26* (2013.01); *C08L 77/06* (2013.01); *C08G 69/265* (2013.01)

(58) Field of Classification Search
CPC ....... C08G 69/265; C08G 69/26; C08L 77/06; C08J 2377/06
See application file for complete search history.

(56) References Cited

U.S. PATENT DOCUMENTS

| 4,740,582 A | 4/1988 | Coquard et al. |
| 4,826,951 A | 5/1989 | Coquard et al. |
| 2002/0183480 A1 | 12/2002 | Okushita et al. |
| 2006/0235190 A1* | 10/2006 | Hoffmann ............. C08G 69/34 528/310 |
| 2014/0316062 A1* | 10/2014 | Janssen ................. C08L 77/06 528/340 |
| 2015/0210852 A1 | 7/2015 | Satou et al. |
| 2017/0158817 A1 | 6/2017 | Ogiwara et al. |
| 2017/0298181 A1* | 10/2017 | Rulkens ................ C08G 69/30 |

FOREIGN PATENT DOCUMENTS

| CN | 106661022 | 5/2017 |
| EP | 2123694 | 11/2009 |
| GB | 1137151 | 12/1968 |
| JP | 61-225213 | 10/1986 |
| JP | 63-23927 | 2/1988 |
| JP | 2003-012800 | 1/2003 |
| JP | 2006-509878 | 3/2006 |
| JP | 2014-506614 | 3/2014 |
| JP | 2017-530218 | 10/2017 |
| WO | 2015/169776 | 11/2015 |
| WO | 2016/001949 | 1/2016 |

OTHER PUBLICATIONS

International Search Report in PCT/JP2019/041465 dated Jan. 21, 2019.
Office Action dated Dec. 28, 2022 in corresponding Chinese Patent Application No. 2019800069753.9 and English translation.
Extended European Search Report in corresponding European Patent Application No. 19876267.6, dated Nov. 5, 2021.
Wloch et al., "The Effect of High Molecular Weight Bio-based Diamine Derivative of Dimerized Fatty Acids Obtained from Vegetable Oils on the Structure, Morphology and Selected Properties of Poly(ether-urethane-urea)s", Journal of Polymers and the Environment (2018) vol. 26, No. 4, pp. 1592-1604, published online Jun. 24, 2017.
Official Communication pursuant to Article 94(3) for corresponding European Application No. 19 876 267.6 dated Nov. 28, 2023 (7 pgs.).

* cited by examiner

*Primary Examiner* — Gregory Listvoyb
(74) *Attorney, Agent, or Firm* — DLA PIPER LLP (US)

(57) ABSTRACT

A flexible polyamide including a unit formed from an aliphatic dicarboxylic acid (A1) having 18 or more carbon atoms and/or a unit formed from an aliphatic diamine (B1) having 18 or more carbon atoms, wherein the polyamide has a total content of 10 to 90% by mass of the unit formed from (A1) and the unit formed from (B1) and has a melting point of 240° C. or higher.

8 Claims, No Drawings

FLEXIBLE POLYAMIDE

TECHNICAL FIELD

The present invention relates to polyamides having a high thermal resistance and flexibility.

BACKGROUND ART

Since thermoplastic polyamides having both hard segments and soft segments and phase-separated structures formed in respective segments are easily melt processed and highly flexible, they have been used for tubes, hoses, shoes, sealing materials, etc. The thermoplastic polyamides often have hard segments constructed of crystalline polyamide such as polyamide 6, polyamide 11, or polyamide 12, and soft segments constructed of a block copolymer formed of polyether or the like, and the bond between the hard segment and the soft segment is often an ester bond.

However, the thermoplastic polyamide resin including the above structures has a problem of having a lower melting point and a lower thermal resistance than the thermoplastic polyester having hard segments and soft segments.

Polymerization at an elevated temperature is required for manufacture of a polyamide having a high melting point. However, at a high polymerization temperature, soft segments are decomposed and shortened in the length by water generated in condensation reaction, amino groups contained in raw material monomers, and amino groups generated in hydrolysis of the polyamide, which results in a problem of lowering a molecular weight of the obtained polyamide and exhibiting insufficient performance.

As thermoplastic polyamides having a high thermal resistance and having hard segments and soft segments, for example, Patent Literature 1 discloses polyamides including a unit formed from an aliphatic polyamide-forming monomer, a unit formed from a polycarbonate diol, and a unit formed from a dicarboxylic acid.

CITATION LIST

Patent Literature

Patent Literature 1: Japanese Patent Laid-Open No. 2003-12800

SUMMARY OF INVENTION

Technical Problem

However, the thermoplastic polyamides disclosed in Patent Literature 1 have higher melting points than conventional polyamides but of at most 163° C. and thus insufficient thermal resistance.

An object of the present invention is to solve the above problems and provide a polyamide forming a phase-separated structure composed of soft segments and hard segments, which is considered to be preferred as a highly flexible morphology, without including a polyether or polyester component that is more decomposable during polymerization, and having an excellent flexibility and a high melting point.

Solution to Problem

The present inventors have found, as a result of diligent efforts to solve the above problems, that a polyamide including 10 to 90% by mass in total of a unit formed from an aliphatic dicarboxylic acid having 18 or more carbon atoms and/or a unit formed from an aliphatic diamine having 18 or more carbon atoms can achieve the object, and thus have completed the present invention.

More specifically, the summary of the present invention is as follows:

(1) A flexible polyamide including a unit formed from an aliphatic dicarboxylic acid (A1) having 18 or more carbon atoms and/or a unit formed from an aliphatic diamine (B1) having 18 or more carbon atoms,
   wherein the polyamide has a total content of 10 to 90% by mass of the unit formed from the aliphatic dicarboxylic acid (A1) having 18 or more carbon atoms and the unit formed from the aliphatic diamine (B1) having 18 or more carbon atoms, and
   has a melting point of 240° C. or higher.

(2) The flexible polyamide according to (1), wherein the polyamide has a tensile elongation at break of 30% or more.

(3) The flexible polyamide according to (1) or (2), wherein the aliphatic dicarboxylic acid (A1) having 18 or more carbon atoms is dimer acid.

(4) The flexible polyamide according to any one of (1) to (3), wherein the aliphatic diamine (B1) having 18 or more carbon atoms is dimer diamine.

(5) The flexible polyamide according to any one of (1) to (4), including a unit formed from a dicarboxylic acid (A2) having 12 or less carbon atoms.

(6) The flexible polyamide according to any one of (1) to (5), including a unit formed from a diamine (B2) having 12 or less carbon atoms.

(7) The flexible polyamide according to (5), wherein the dicarboxylic acid (A2) having 12 or less carbon atoms is terephthalic acid.

(8) The flexible polyamide according to (6), wherein the diamine (B2) having 12 or less carbon atoms is 1,10-decanediamine.

(9) The flexible polyamide according to any one of (1) to (8), including no segments formed of polyether or polyester.

(10) A molded body constructed by molding the flexible polyamide according to any one of (1) to (9).

(11) A method for manufacturing the flexible polyamide according to any one of (1) to (9), wherein polymerization is conducted at a temperature equal to or lower than the melting point of the polyamide.

Advantageous Effects of Invention

According to the present invention it is possible to provide a polyamide excellent in flexibility and having a high melting point since it includes a specific amount of a unit formed from an aliphatic dicarboxylic acid having or more carbon atoms and/or a unit formed from an aliphatic diamine having 18 or more carbon atoms, without including a polyether or polyester component which is apt to decompose during polymerization.

DESCRIPTION OF EMBODIMENTS

The polyamide of the present invention needs to include a unit formed from an aliphatic dicarboxylic acid (A1) having 18 or more carbon atoms and/or a unit formed from an aliphatic diamine (B1) having 18 or more carbon atoms.

In the polyamide of the present invention, the unit formed from (A1) and/or the unit formed from (B1) form soft segments.

In the polyamide of the present invention, a total content of the unit formed from (A1) and the unit formed from (B1) needs to be 10 to 90% by mass, and it is preferably 15 to 80% by mass, more preferably 40 to 80% by mass, and still more preferably 50 to 75% by mass. If the total content in the polyamide of the present invention is less than 10% by mass, the flexibility is lowered, while if the total content is more than 90% by mass, the thermal resistance is lowered.

From the viewpoints of flexibility and elongation of the polyamide of the present invention, it preferably simultaneously includes the unit formed from the aliphatic dicarboxylic acid (A1) having 18 or more carbon atoms and the unit formed from the aliphatic diamine (B1) having 18 or more carbon atoms, and the mass ratio (unit formed from (A1)/unit formed from (B1)) is preferably 90/10 to 10/90, more preferably 70/30 to 10/90, and still more preferably 50/50 to 10/90.

Incidentally, it is preferred to include the unit formed from the aliphatic diamine (B1) having 18 or more carbon atoms without (A1) than to include the unit formed from the aliphatic dicarboxylic acid (A1) having 18 or more carbon atoms without (B1), from the viewpoints of flexibility and thermal resistance.

The aliphatic dicarboxylic acid (A1) having 18 or more carbon atoms is preferably formed from hydrocarbon only except for the carboxyl groups and includes, for example, hexadecanedicarboxylic acid (18 carbon atoms), octadecanedicarboxylic acid (20 carbon atoms), and dimer acid (36 carbon atoms).

Among these, (A1) is more preferably an aliphatic dicarboxylic acid having 20 or more carbon atoms, and still more preferably dimer acid because such a type of (A1) can provide polyamides having a high flexibility. Dimer acid may have unsaturated bonds, but since it is difficult to color, it is preferably hydrogenated to form all the carbon-carbon bonds into saturation.

The aliphatic diamine (B1) having 18 or more carbon atoms is preferably formed from hydrocarbon only except for the amino groups, and includes, for example, octadecanediamine (18 carbon atoms), eicosanediamine (20 carbon atoms), and dimer diamine (36 carbon atoms).

Among these, (B1) is preferably dimer diamine because it can provide polyamides having a high flexibility even if its content is small. Dimer diamine can be produced by reaction of dimer acid with ammonia followed by dehydration, cyanation and reduction. Dimer diamine may have unsaturated bonds, but since it is difficult to color, it is preferably hydrogenated to form all the bonds into saturation.

In the polyamide of the present invention, units other than the unit formed from the aliphatic dicarboxylic acid (A1) having 18 or more carbon atoms and the unit formed from the aliphatic diamine (B1) having 18 or more carbon atoms mainly form hard segments.

A unit for constructing the hard segments is not particularly limited, but is preferably a unit formed from a dicarboxylic acid (A2) having 12 or less carbon atoms or a unit formed from a diamine (B2) having 12 or less carbon atoms.

The dicarboxylic acid (A2) having 12 or less carbon atoms includes, for example, sebacic acid (10 carbon atoms), azelaic acid (9 carbon atoms), adipic acid (6 carbon atoms), terephthalic acid (8 carbon atoms), isophthalic acid (8 carbon atoms), and orthophthalic acid (8 carbon atoms). Among these, because the flexibility is improved, the dicarboxylic acid having 8 or more carbon atoms is preferably included.

Moreover, the diamine (B2) having 12 or less carbon atoms includes dodecanediamine (12 carbon atoms), undecanediamine (11 carbon atoms), decanediamine (10 carbon atoms), nonanediamine (9 carbon atoms), octanediamine (8 carbon atoms), hexanediamine (6 carbon atoms), butanediamine (4 carbon atoms). Among these, because the flexibility is improved, a diamine having 8 or more carbon atoms is preferably included.

In the present invention, the hard segments preferably consist of units composing a highly crystalline polyamide. The highly crystalline polyamide is preferably a semicrystalline polyamide consisting of an aromatic dicarboxylic acid and an aliphatic diamine, and includes, for example, polyamide 4T, polyamide 9T, polyamide 10T, and polyamide 12T, with polyamide 10T being preferred among these because of favorable balance between thermal resistance and crystallinity thereof. Therefore, for composing the hard segments, (A2) is preferably terephthalic acid, and (B2) is preferably butanediamine, nonanediamine, decanediamine, or dodecanediamine, and more preferably 1,10-decanediamine.

When units for composing the hard segments are units composing a highly crystalline polyamide, the polyamide thus obtained has an improved thermal resistance and forms a structure highly phase-separated between the hard and soft segments, which improves the flexibility.

Soft segments formed of a unit formed from an aliphatic dicarboxylic acid (A1) having 18 or more carbon atoms and/or a unit formed from an aliphatic diamine (B1) having 18 or more carbon atoms tend to have a shorter segment length, compared with soft segments formed of polyether or polyester. As the soft segments are shortened in the segment length, it may be difficult to form a phase-separated structure with the hard segments. However, in the present invention, by selecting the units for composing the highly crystalline polyamide as the units composing the hard segments, a phase-separated structure can be formed even if the soft segment length is short.

The polyamide of the present invention preferably does not include any segment formed of polyether or polyester that is likely to decompose upon polymerization. The polyether includes, for example, polyoxyethylene glycol, polyoxypropylene glycol, polyoxytetramethylene glycol, and polyoxyethylene.polyoxypropylene glycol, and the polyester includes, for example, polyethylene adipate, polytetramethylene adipate, and polyethylene sebacate. Polyamides including segments formed of polyether or polyester may be decomposed when a polymerization temperature is elevated.

The polyamide of the present invention may include a terminal blocking agent for the purpose of adjusting the degree of polymerization, inhibiting decomposition of a product, inhibiting coloring, etc. The terminal blocking agent includes, for example, monocarboxylic acids such as acetic acid, lauric acid, benzoic acid and stearic acid, and monoamines such as octylamine, cyclohexylamine, aniline, stearylamine, etc. The terminal blocking agent may be used alone or in combination thereof. The content of the terminal blocking agent is not particularly limited, but is usually 0 to 10 mol % relative to the total molar amount of the dicarboxylic acid and the diamine.

The polyamide of the present invention may include additives. The additives includes fibrous reinforcing materials such as glass fibers and carbon fibers, fillers such as talc, swelling clay minerals, silica, alumina, glass beads and graphite, pigments such as titanium oxide and carbon black, antioxidants, agents for heat aging resistance, antistatic agents, flame-retardant agents, and flame-retardant auxiliaries. The additive may be included at the time of polymerization, or may be included by melt-kneading, etc., after polymerization.

The polyamide of the present invention is excellent in thermal resistance, and a melting point, which is an index of thermal resistance, needs to be 240° C. or higher, preferably 250° C. or higher, more preferably 270° C. or higher, and still more preferably 300° C. or higher.

The polyamide of the present invention is excellent in a flexibility, and a tensile elongation at break, which is an index of flexibility, is preferably 30% or more, more preferably 50% or more, and still more preferably 100% or more. A polyamide with a tensile elongation at break of less than 30% may have insufficient performance as a flexible material.

The polyamide of the present invention has a shore-D hardness, which is an index of flexibility, preferably of 80 or less, more preferably of 70 or less, and still more preferably of 60 or less.

Further, the polyamide of the present invention also has a tensile elastic modulus, which is also an index of flexibility, preferably of 1800 MPa or less, more preferably of 1200 MPa or less, still more preferably of 600 MPa or less, and most preferably of 400 MPa or less.

The method for producing the polyamide of the present invention is not particularly limited, and the polyamide can be produced by a normal polymerization method including, for example, polymerizing raw material monomers by removing condensed water from the system while heating them in a pressure vessel equipped with a stirrer or a continuous polymerization facility.

A catalyst may be used in the production of the polyamide of the present invention, if necessary. The catalyst includes, for example, phosphoric acid, phosphorous acid, hypophosphorous acid or a salt thereof. The content of the catalyst is not particularly limited, but is usually 2 molt or less based on the total molar amount of the dicarboxylic acid and the diamine.

Moreover, in the production of the polyamide of the present invention, an organic solvent or water may be added as needed.

In the production of the polyamide of the present invention, the polymerization may be carried out in a closed system or at normal pressure. When it is carried out in the closed system, since the pressure may increase due to volatilization of the monomer or generation of condensed water, etc., the pressure should be preferably appropriately controlled. On the other hand, when the boiling point of the monomer used is high and the monomer does not flow out of the system without pressurization, it can be polymerized at normal pressure. When the raw material monomers are, for example, a combination of dimer acid, dimer diamine, terephthalic acid, and decanediamine, it can be polymerized at normal pressure.

In the production of the polyamide of the present invention, it is preferred to carry out the polymerization in a nitrogen atmosphere or in a vacuum in order to prevent oxidative deterioration.

The polymerization temperature is not particularly limited, but is usually 150 to 300° C. In order to inhibit the decomposition and deterioration reaction of the obtained polyamide, the polymerization is preferably carried out at a temperature not exceeding 300° C.

In the production method of the present invention, it is preferred to carry out the polymerization at a temperature equal to or lower than the melting point of the polyamide. When polymerized at a temperature equal to or lower than the melting point of the polyamide, the hard segment component remains precipitated, however the soft segment component is in a molten state, so that the entire reaction product has its fluidity. Therefore, the polymerization can be carried out with an existing melt polymerization equipment and by a conventional process for the polyamide. In this case, the polymerization of the hard segments proceeds in a state like solid phase polymerization. The method for polymerizing at a temperature equal to or below the melting point is particularly effective in polymerization of a polyamide having a high melting point of 280° C. or higher at which the polyamide is likely to decompose due to the high polymerization temperature.

The polyamide after polymerization may be extruded into strands as pellets, or may be hot-cut or underwater-cut into pellets.

In the manufacturing method of the present invention, solid phase polymerization may be further carried out in order to increase a molecular weight. The solid-phase polymerization is particularly effective when a viscosity at the time of polymerization is high, the operation becomes difficult, etc. The solid-phase polymerization is preferably carried out by heating at a temperature lower than the melting point of the resin for 30 minutes or longer under a flow of an inert gas or under reduced pressure, and it is more preferably carried out by heating for 1 hour or longer.

The polyamide of the present invention can be formed into a molded body by an injection molding method, an extrusion molding method, a blow molding method, a sintering molding method, etc. Of these, the injection molding method is preferable because it has a large effect of improving mechanical properties and moldability. The injection molding machine is not particularly limited, and includes, for example, a screw in-line type injection molding machine or a plunger type injection molding machine. The polyamide heated and melted in a cylinder of the injection molding machine is weighed for each shot, injected into the mold in a molten state, cooled and solidified in a predetermined shape, and then taken out from the mold as a molded body. The heater set temperature during injection molding is preferably equal to or higher than the melting point.

When the polyamide of the present invention is heated and melted, it is preferred to use pellets that have been sufficiently dried. If the amount of water contained in the pellets is large, it may foam in a cylinder of the injection molding machine, making it difficult to obtain an optimum molded body. The water content of the pellets used for injection molding is preferably less than 0.3 parts by mass and more preferably less than 0.1 parts by mass with respect to 100 parts by mass of the polyamide.

Since the polyamide of the present invention has an excellent flexibility and a high melting point, it can also be used as a heat-resistant elastomer. Specifically, it can favorably be used for automotive parts such as fuel tubes, brake pipes, intake/exhaust system parts, etc., intake/exhaust system pipes, and vibration damping materials; electrical and electronic parts such as pipes, seats, and connectors; gears, valves, oil pans, cooling fans, radiator tanks, cylinder heads, canisters, hoses, deformed materials, injection molding products, sheets, films, monofilaments for 3D printer modeling and fishing threads, fibers, etc.

EXAMPLES

The present invention will be described in more detail with reference to the following examples, however, the scope of the present invention is not limited thereto.

A. Evaluation Method

The characteristics of polyamides were obtained by the following methods.

(1) Composition

The pellets and powder obtained were analyzed by $^1$H-NMR using a high-resolution nuclear magnetic resonance apparatus (ECA-500NMR manufactured by JEOL Ltd.), and the resin composition was determined from the peak intensity of each copolymer component (resolution: 500 MHz, solvent: mixed solvent with a volume ratio of deuterated trifluoroacetic acid and deuterated chloroform of 4/5, temperature: 23° C.)

(2) Melting Point

A few mg of the obtained pellets and powder was sampled, and a temperature of the sample was raised to 350° C. at a heating rate of 20° C./min by using a differential scanning calorimeter DSC-7 (manufactured by PerkinElmer, Inc.), then held at 350° C. for 5 minutes, lowered to 25° C. at a cooling rate of 20° C./min, and further held at 25° C. for 5 minutes. The top of the endothermic peak observed when the temperature of the sample was raised again at a heating rate of 20° C./min, was defined as a melting point.

The thermal resistance was evaluated from the measurement value of the melting point according to the following criteria.

S: Not lower than 300° C.
A: Not lower than 270° C. and lower than 300° C.
B: Not lower than 240° C. and lower than 270° C.
C: Lower than 240° C.

(3) Melt Flow Rate (MFR)

By using the obtained pellets and powder, measurement was carried out at 340° C. and a load of 1.2 kgf according to JIS K7210.

(4) Tensile Strength, Tensile Elastic Modulus, Tensile Elongation At Break

After the obtained pellets and powder were sufficiently dried, they were molded by using an injection molding machine under the conditions of a cylinder temperature of 340° C. and a mold temperature of 80° C., and test pieces (dumbbell pieces) for measuring general physical properties conforming ISO standard were fabricated. By using the obtained test piece, the tensile strength, tensile elastic modulus, and tensile elongation at break were measured according to ISO178.

A flexibility was evaluated from the measurement value of tensile elongation at break according to the following criteria.

S: Not less than 150%
A: Not less than 100% and less than 150%
B: Not less than 30% and less than 100%
C: Less than 30%

Moreover, the flexibility was evaluated from the measurement value of tensile elastic modulus according to the following criteria.

S: Not more than 400 MPa
A: Exceeding 400 MPa and not more than 1200 MPa
B: Exceeding 1200 MPa and not more than 1800 MPa
C: Exceeding 1800 MPa (5) Shore-D Hardness By using the test pieces obtained in (4) above, measurement was carried out in accordance with ASTM D 2240.

A flexibility was evaluated from the measurement value of Shore-D according to the following criteria.

S: Not more than 60
A: Exceeding 60 and not more than 70
B: Exceeding 70 and not more than 80
C: Exceeding 80

B. Raw Material

The following materials were used as dimer acid and dimer diamine.

Dimer acid: Pripole 1009 manufactured by Croda International plc.
Dimer diamine: Priamine 1075 manufactured by Croda International plc.

Example 1

In a reaction vessel equipped with a heating mechanism and a stirring mechanism, 26.7 parts by mass of dimer acid, 25.3 parts by mass of dimer diamine, 23.5 parts by mass of terephthalic acid, 24.4 parts by mass of 1,10-decanediamine, and 0.1 parts by mass of sodium hypophosphite monohydrate, were charged.

Thereafter, the mixture was heated to 260° C. with stirring, and polymerization was carried out under a nitrogen stream at normal pressure and 260° C. for 5 hours while removing condensed water from the system. During the polymerization, the system was in suspension.

After completion of the polymerization, the product was removed, cut and dried to obtain polyamide pellets.

Examples 2 to 12, 14, and Comparative Example 2

Polyamide pellets were obtained by carrying out the same operation as in Example 1 except that the monomers to be charged into the reaction vessel were changed as shown in Tables 1 and 2.

Example 13

In a reaction vessel equipped with a heating mechanism and a stirring mechanism, 25.5 parts by mass of dimer acid, 24.1 parts by mass of dimer diamine, 28.0 parts by mass of adipic acid, 22.3 parts by mass of 1,6-hexanediamine, and 0.1 parts by mass of sodium hypophosphite monohydrate were charged. Thereafter, the mixture was heated to 270° C. under sealing with stirring, and polymerized at 270° C. for 3 hours. Then, the pressure was gradually lowered to normal pressure, and the polymerization was further carried out for 1 hour. During the polymerization, the system was in suspension.

After the polymerization was completed, the product was removed, cut and dried to obtain polyamide pellets.

Comparative Example 1

Into a powder stirring device equipped with a heating mechanism, 49.0 parts by mass of terephthalic acid and 0.1 parts by mass of sodium hypophosphite monohydrate were charged. While stirring heating at 170° C., 50.9 parts by mass of 1,10-decanediamine was added little by little over 3 hours to obtain a nylon salt. Then, the nylon salt was heated to 250° C. with stirring, and polymerization was carried out under a nitrogen stream at normal pressure and 250° C. for 7 hours while removing condensed water from the system. During the polymerization, the system was in powder form.

After completion of the polymerization, the product was removed to obtain polyamide powder.

Comparative Example 3

Into a reaction vessel equipped with a heating mechanism and a stirring mechanism, 51.3 parts by mass of dimer acid, 48.6 parts by mass of dimer diamine, and 0.1 parts by mass of sodium hypophosphite monohydrate were charged.

Subsequently, the mixture was heated to 260° C. while stirring, and polymerization was carried out under a nitrogen stream at normal pressure and 260° C. for 5 hours while removing condensed water from the system. During the polymerization, the system was in a uniform molten state.

After completion of the polymerization, the product was removed, cut and dried to obtain polyamide pellets.

Comparative Example 4

51.0 parts by mass of polyoxytetramethylene glycol (PTMG1000) having amino groups instead of the hydroxyl groups at both ends, and having number average molecular weight of 1000, 28.3 parts by mass of terephthalic acid, 20.6 parts by mass of 1,10-decanediamine, and 0.1 parts by mass of sodium hypophosphite monohydrate were charged in a reaction vessel equipped with a heating mechanism and a stirring mechanism, heated to 250° C. with stirring, and polymerization was carried out for 5 hours under a nitrogen stream at normal pressure and 250° C. while releasing generated water vapor. During the polymerization, the system was in suspension.

After completion of the polymerization, the product was removed, cut and dried, however, the polymerized product was brittle and unsuitable for practical use.

Tables 1 and 2 show the charging compositions of the polyamides, and Tables 3 and 4 show the characteristics of the obtained polyamides.

TABLE 1

| | | | | | Example | | | | | | | | | |
|---|---|---|---|---|---|---|---|---|---|---|---|---|---|---|
| | | | | | 1 | 2 | 3 | 4 | 5 | 6 | 7 | 8 | 9 |
| Production conditions for polyamide | Charging composition (part by mass) | Dicarboxylic acid | Aliphatic group (A1) having 18 or more carbon atoms | Dimeric acid | 26.7 | 5.4 | 16.3 | 31.6 | 44.0 | 49.8 | — | — | 34.5 |
| | | | | 1,18-Octadecanedicarboxylic acid | — | — | — | — | — | — | — | 20.5 | — |
| | | | (A2) having 12 or less carbon atoms | Terephthalic acid | 23.5 | 43.8 | 33.4 | 18.8 | 6.9 | 17.1 | 32.3 | 23.2 | 23.6 |
| | | | | Adipic acid | — | — | — | — | — | — | — | — | — |
| | | Diamine | Aliphatic group (B1) having 18 or more carbon atoms | Dimer diamine | 25.3 | 5.1 | 15.4 | 29.9 | 41.7 | — | 50.1 | 32.1 | — |
| | | | | 1,18-Octadecanediamine | — | — | — | — | — | — | — | — | 17.3 |
| | | | (B2) having 12 or less carbon atoms | 1,10-Decanediamine | 24.4 | 45.6 | 34.8 | 19.6 | 7.3 | 33.0 | 17.5 | 24.1 | 24.5 |
| | | | | 1,12-Dodecanediamine | — | — | — | — | — | — | — | — | — |
| | | | | 1,6-Hexanediamine | — | — | — | — | — | — | — | — | — |
| | | | | PTMG1000 having amino groups at both ends | — | — | — | — | — | — | — | — | — |
| | | Catalyst | | Sodium hypophosphite monohyddrate | 0.1 | 0.1 | 0.1 | 0.1 | 0.1 | 0.1 | 0.1 | 0.1 | 0.1 |

TABLE 2

| | | | | | Example | | | | | Comparative Example | | | |
|---|---|---|---|---|---|---|---|---|---|---|---|---|---|
| | | | | | 10 | 11 | 12 | 13 | 14 | 1 | 2 | 3 | 4 |
| Production conditions for polyamide | Charging composition (part by mass) | Dicarboxylic acid | Aliphatic group (A1) having 18 or more carbon atoms | Dimeric acid | 25.6 | 29.0 | 48.6 | 25.5 | 32.7 | — | 4.4 | 51.3 | — |
| | | | | 1,18-Octadecanedicarboxylic acid | — | — | — | — | — | — | — | — | — |
| | | | (A2) having 12 or less carbon atoms | Terephthalic acid | 21.4 | 25.5 | 24.3 | — | — | 49.0 | 44.7 | — | 28.3 |
| | | | | Adipic acid | — | — | — | 28.0 | 33.7 | — | — | — | — |
| | | Diamine | Aliphatic group (B1) having 18 or more carbon atoms | Dimer diamine | 25.9 | 27.5 | — | 24.1 | — | — | 4.2 | 48.6 | — |
| | | | | 1,18-Octadecanediamine | — | — | — | — | — | — | — | — | — |
| | | | (B2) having 12 or less carbon atoms | 1,10-Decanediamine | — | — | — | — | — | 50.9 | 46.6 | — | 20.6 |
| | | | | 1,12-Dodecanediamine | 27.0 | — | — | — | — | — | — | — | — |
| | | | | 1,6-Hexanediamine | — | 17.9 | 27.0 | 22.3 | 33.5 | — | — | — | — |
| | | | | PTMG1000 having amino groups at both ends | — | — | — | — | — | — | — | — | 51.0 |
| | | Catalyst | | Sodium hypophosphite monohyddrate | 0.1 | 0.1 | 0.1 | 0.1 | 0.1 | 0.1 | 0.1 | 0.1 | 0.1 |

TABLE 3

|  |  |  |  |  | Example |  |  |  |  |
|---|---|---|---|---|---|---|---|---|---|
|  |  |  |  |  | 1 | 2 | 3 | 4 | 5 |
| Polyamide characteristics | Final composition (% by mass of each unit) | Dicarboxylic acid | Aliphatic group (A1) having 18 or more carbon atoms | Dimeric acid | 27.0 | 5.7 | 16.8 | 31.7 | 43.3 |
|  |  |  |  | 1,18-Octadecanedicarboxylic acid | — | — | — | — | — |
|  |  |  | (A2) having 12 or less carbon atoms | Terephthalic acid | 20.1 | 38.7 | 29.0 | 15.9 | 5.8 |
|  |  |  |  | Isophthalic acid | — | — | — | — | — |
|  |  |  |  | Adipic acid | — | — | — | — | — |
|  |  | Diamine | Aliphatic group (B1) having 18 or more carbon atoms | Dimer diamine | 27.1 | 5.7 | 16.8 | 31.8 | 43.4 |
|  |  |  |  | 1,18-Octadecanediamine | — | — | — | — | — |
|  |  |  | (B2) having 12 or less carbon atoms | 1,10-Decanediamine | 25.8 | 48.9 | 37.4 | 20.6 | 7.5 |
|  |  |  |  | 1,12-Dodecanediamine | — | — | — | — | — |
|  |  |  |  | 1,6-Hexanediamine | — | — | — | — | — |
|  |  |  |  | PTMG1000 having amino groups at both ends | — | — | — | — | — |
|  | Unit formed from (A1) and unit formed from (B1) | | Total content (% by mass) | | 54.1 | 11.4 | 33.6 | 63.5 | 86.7 |
|  |  | | Mass ratio of contents ((A1)/(B1)) | | 50/50 | 50/50 | 50/50 | 50/50 | 50/50 |
|  | Evaluation | | Melting point (° C.) | | 302 (S) | 310 (S) | 308 (S) | 300 (S) | 300 (S) |
|  |  | | MFR (g/min) | | 10.3 | 15.5 | 11.1 | 9.7 | 9.0 |
|  |  | | Tensile strength (MPa) | | 36 | 78 | 59 | 32 | 23 |
|  |  | | Tensile elastic modulus (MPa) | | 326 (S) | 1740 (B) | 804 (A) | 211 (S) | 140 (S) |
|  |  | | Tensile elongation at break (%) | | 173 (S) | 50 (B) | 123 (A) | 255 (S) | 305 (S) |
|  |  | | Shore D hardness | | 60 (S) | 78 (B) | 65 (A) | 51 (S) | 39 (S) |

|  |  |  |  |  | Example |  |  |  |
|---|---|---|---|---|---|---|---|---|
|  |  |  |  |  | 6 | 7 | 8 | 9 |
| Polyamide characteristics | Final composition (% by mass of each unit) | Dicarboxylic acid | Aliphatic group (A1) having 18 or more carbon atoms | Dimeric acid | 50.3 | — | — | 35.0 |
|  |  |  |  | 1,18-Octadecanedicarboxylic acid | — | — | 19.9 | — |
|  |  |  | (A2) having 12 or less carbon atoms | Terephthalic acid | 14.7 | 27.7 | 19.9 | 20.3 |
|  |  |  |  | Isophthalic acid | — | — | — | — |
|  |  |  |  | Adipic acid | — | — | — | — |
|  |  | Diamine | Aliphatic group (B1) having 18 or more carbon atoms | Dimer diamine | — | 53.8 | 34.5 | — |
|  |  |  |  | 1,18-Octadecanediamine | — | — | — | 18.6 |
|  |  |  | (B2) having 12 or less carbon atoms | 1,10-Decanediamine | 35.0 | 18.5 | 25.7 | 26.1 |
|  |  |  |  | 1,12-Dodecanediamine | — | — | — | — |
|  |  |  |  | 1,6-Hexanediamine | — | — | — | — |
|  |  |  |  | PTMG1000 having amino groups at both ends | — | — | — | — |
|  | Unit formed from (A1) and unit formed from (B1) | | Total content (% by mass) | | 50.3 | 53.8 | 54.4 | 53.6 |
|  |  | | Mass ratio of contents ((A1)/(B1)) | | 100/0 | 0/100 | 37/63 | 65/35 |
|  | Evaluation | | Melting point (° C.) | | 289 (A) | 273 (A) | 306 (S) | 307 (S) |
|  |  | | MFR (g/min) | | 30.2 | 25.7 | 8.3 | 14.4 |
|  |  | | Tensile strength (MPa) | | 40 | 48 | 58 | 62 |
|  |  | | Tensile elastic modulus (MPa) | | 618 (A) | 575 (A) | 1590 (B) | 1320 (B) |
|  |  | | Tensile elongation at break (%) | | 101 (A) | 118 (A) | 34 (B) | 53 (B) |
|  |  | | Shore D hardness | | 65 (A) | 63 (A) | 75 (B) | 71 (B) |

TABLE 4

|  |  |  |  |  | Example |  |  |  |  |
|---|---|---|---|---|---|---|---|---|---|
|  |  |  |  |  | 10 | 11 | 12 | 13 | 14 |
| Polyamide characteristics | Final composition (% by mass of each unit) | Dicarboxylic acid | Aliphatic group (A1) having 18 or more carbon atoms | Dimeric acid | 27.2 | 30.2 | 50.7 | 26.2 | 35.1 |
|  |  |  |  | 1,18-Octadecanedicarboxylic acid | — | — | — | — | — |
|  |  |  | (A2) having 12 or less carbon atoms | Terephthalic acid | 18.2 | 21.7 | 20.8 | — | — |
|  |  |  |  | Isophthalic acid | — | — | — | — | — |
|  |  |  |  | Adipic acid | — | — | — | 23.5 | 28.6 |
|  |  | Diamine | Aliphatic group (B1) having 18 or more carbon atoms | Dimer diamine | 27.3 | 29.3 | — | 26.3 | — |
|  |  |  |  | 1,18-Octadecanediamine | — | — | — | — | — |

TABLE 4-continued

|  |  |  |  |  |  |  |  |  |
|---|---|---|---|---|---|---|---|---|
|  |  | (B2) having 12 or less carbon atoms | 1,10-Decanediamine | — | — | — | — | — |
|  |  |  | 1,12-Dodecanediamine | 27.3 | — | — | — | — |
|  |  |  | 1,6-Hexanediamine | — | 18.8 | 28.5 | 24.0 | 36.3 |
|  |  |  | PTMG1000 having amino groups at both ends | — | — | — | — | — |
| Unit formed from (A1) and unit formed from (B1) |  |  | Total content (% by mass) | 54.5 | 59.5 | 50.7 | 52.5 | 35.1 |
|  |  |  | Mass ratio of contents ((A1)/(B1)) | 50/50 | 51/49 | 100/0 | 50/50 | 100/0 |
| Evaluation |  |  | Melting point (° C.) | 282 (A) | 319 (S) | 295 (A) | 241 (B) | 250 (B) |
|  |  |  | MFR (g/min) | 13.1 | 17.5 | 28.3 | 36.7 | 10.6 |
|  |  |  | Tensile strength (MPa) | 31 | 98 | 50 | 45 | 66 |
|  |  |  | Tensile elastic modulus (MPa) | 295 (S) | 587 (A) | 650 (A) | 303 (S) | 760 (A) |
|  |  |  | Tensile elongation at break (%) | 295 (S) | 136 (A) | 80 (A) | 228 (S) | 262 (S) |
|  |  |  | Shore D hardness | 56 (S) | 63 (A) | 68 (A) | 58 (S) | 69 (A) |

|  |  |  |  |  | Comparative Example | | | |
|---|---|---|---|---|---|---|---|---|
|  |  |  |  |  | 1 | 2 | 3 | 4 |
| Polyamide characteristics | Final composition (% by mass of each unit) | Dicarboxylic acid | Aliphatic group (A1) having 18 or more carbon atoms | Dimeric acid | — | 4.6 | 49.9 | — |
|  |  |  |  | 1,18-Octadecanedicarboxylic acid | — | — | — | — |
|  |  |  | (A2) having 12 or less carbon atoms | Terephthalic acid | 43.7 | 39.7 | — | 24.0 |
|  |  |  |  | Isophthalic acid | — | — | — | — |
|  |  |  |  | Adipic acid | — | — | — | — |
|  |  | Diamine | Aliphatic group (B1) having 18 or more carbon atoms | Dimer diamine | — | 4.6 | 50.1 | — |
|  |  |  |  | 1,18-Octadecanediamine | — | — | — | — |
|  |  |  | (B2) having 12 or less carbon atoms | 1,10-Decanediamine | 56.3 | 51.1 | — | 21.7 |
|  |  |  |  | 1,12-Dodecanediamine | — | — | — | — |
|  |  |  |  | 1,6-Hexanediamine | — | — | — | — |
|  |  |  |  | PTMG1000 having amino groups at both ends | — | — | — | 54.3 |
| Unit formed from (A1) and unit formed from (B1) |  |  | Total content (% by mass) | | 0.0 | 9.2 | 100.0 | 54.3 |
|  |  |  | Mass ratio of contents ((A1)/(B1)) | | 0/0 | 50/50 | 50/50 | 0/0 |
| Evaluation |  |  | Melting point (° C.) | | 315 (S) | 313 (S) | — | — |
|  |  |  | MFR (g/min) | | 10.0 | 10.2 | 59.4 | — |
|  |  |  | Tensile strength (MPa) | | 84 | 80 | 16 | — |
|  |  |  | Tensile elastic modulus (MPa) | | 2500 (C) | 2010 (C) | 103 (S) | — |
|  |  |  | Tensile elongation at break (%) | | 7 (C) | 23 (C) | 454 (S) | — |
|  |  |  | Shore D hardness | | 83 (C) | 81 (C) | 33 (S) | — |

Since the polyamides of the Examples have a total content of 10 to 90% by mass of the unit formed from the aliphatic dicarboxylic acid (A1) having 18 or more carbon atoms and the unit formed from the aliphatic diamine (B1) having 18 or more carbon atoms, all of these each has the excellent flexibility, melting point of 240° C. or higher, and excellent thermal resistance.

Because the polyamide of Comparative Example 1 did not include any unit formed from (A1) or any unit formed from (B1), and thus did not have any soft segment, and because the polyamide of Comparative Example 2 had a total content of less than 10% by mass of the unit formed from (A1) and the unit formed from (B1), both were inferior in flexibility.

The polyamide of Comparative Example 3 had no melting point and a low thermal resistance because it had a total content more than 90% by mass of the unit formed from (A1) and the unit formed from (B1).

The invention claimed is:

1. A flexible polyamide comprising a unit formed from an aliphatic dicarboxylic acid (A1) having 18 or more carbon atoms, a unit formed from an aliphatic diamine (B1) having 18 or more carbon atoms, a unit formed from a dicarboxylic acid (A2) having 12 or less carbon atoms, and a unit formed from a diamine (B2) having 8 to 12 carbon atoms,
    wherein the polyamide has a total content of 10 to 90% by mass of the unit formed from the aliphatic dicarboxylic acid (A1) having 18 or more carbon atoms and the unit formed from the aliphatic diamine (B1) having 18 or more carbon atoms, and
    wherein the polyamide has a melting point of 300° C. or higher,
    wherein the aliphatic diamine (B1) having 18 or more carbon atoms comprises dimer diamine, and
    wherein the dicarboxylic acid (A2) having 12 or less carbon atoms comprises aromatic dicarboxylic acid.

2. The flexible polyamide according to claim 1, wherein the polyamide has a tensile elongation at break of 30% or more.

3. The flexible polyamide according to claim 1, wherein the aliphatic dicarboxylic acid (A1) having 18 or more carbon atoms is dimer acid.

4. The flexible polyamide according to claim 1, wherein the dicarboxylic acid (A2) having 12 or less carbon atoms is terephthalic acid.

5. The flexible polyamide according to claim 1, wherein the diamine (B2) having 8 to 12 carbon atoms is 1,10-decanediamine.

6. The flexible polyamide according to claim 1, comprising no segments formed of polyether or polyester.

7. A molded body constructed by molding the flexible polyamide according to claim 1.

8. A method for manufacturing the flexible polyamide according to claim 1, wherein polymerization is conducted at a temperature equal to or lower than the melting point of the polyamide.

* * * * *